Feb. 28, 1950 W. VAN DER SLUYS 2,498,745
LINK STABILIZED RAILWAY TRUCK
Filed Aug. 4, 1943 3 Sheets-Sheet 1
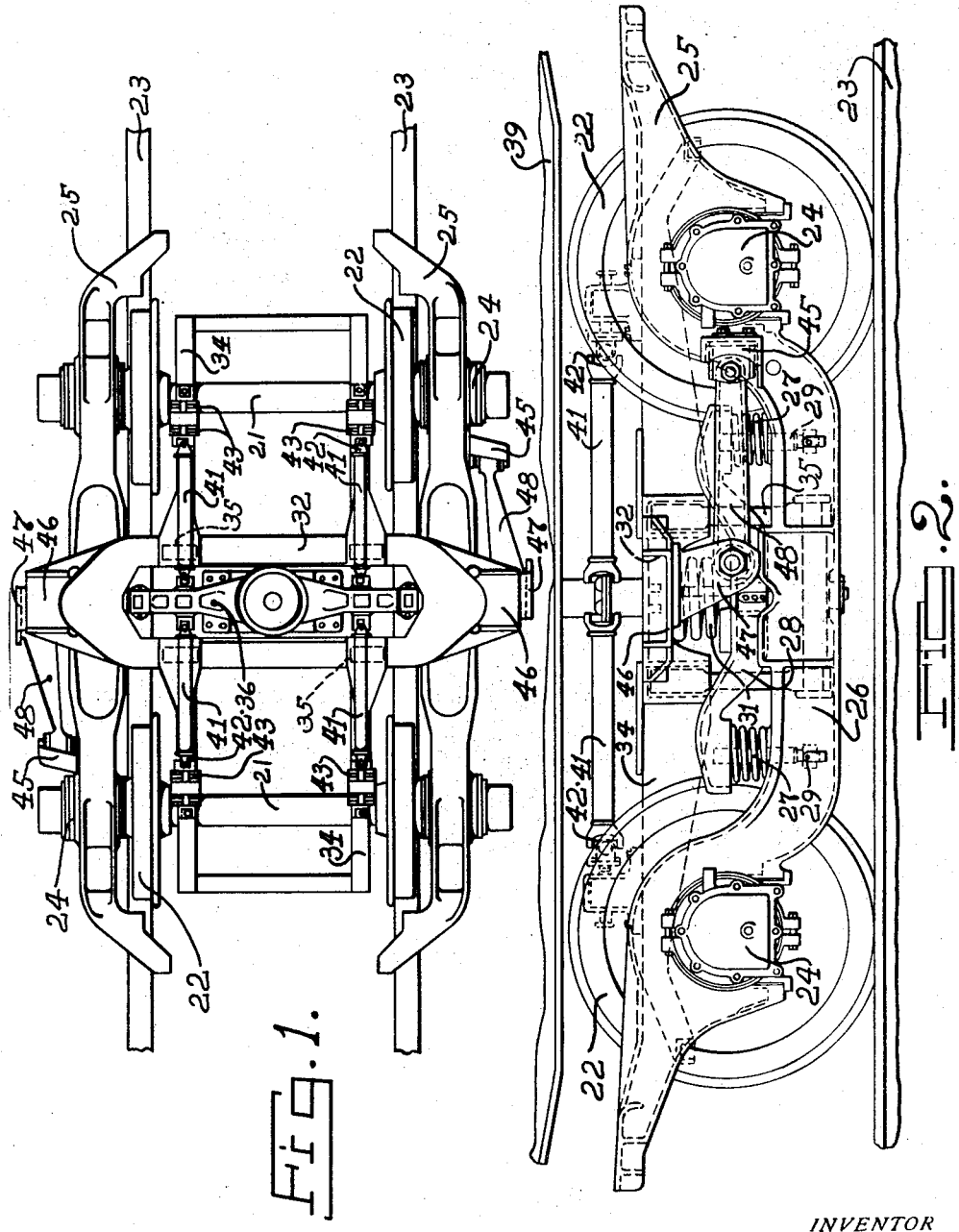
INVENTOR
WILLIAM VAN DER SLUYS
BY
ATTORNEYS

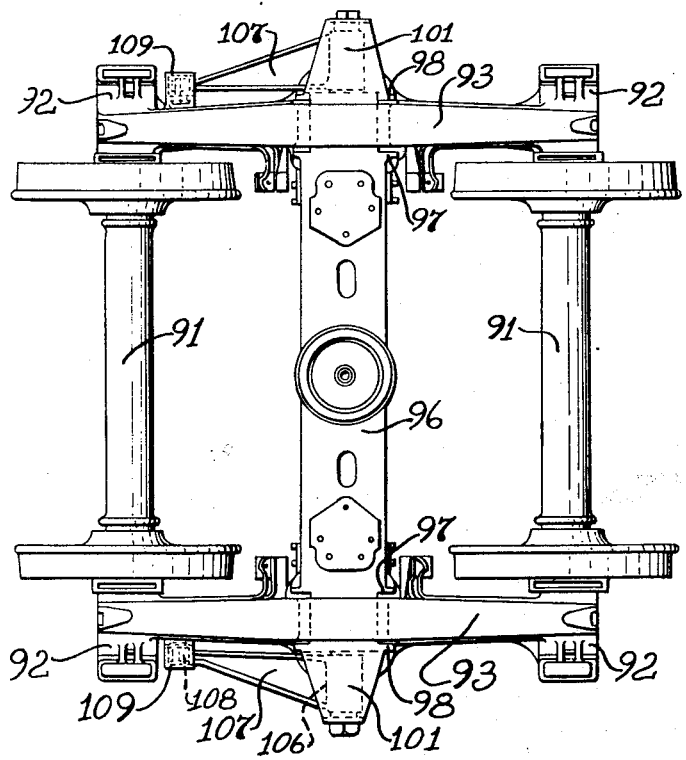
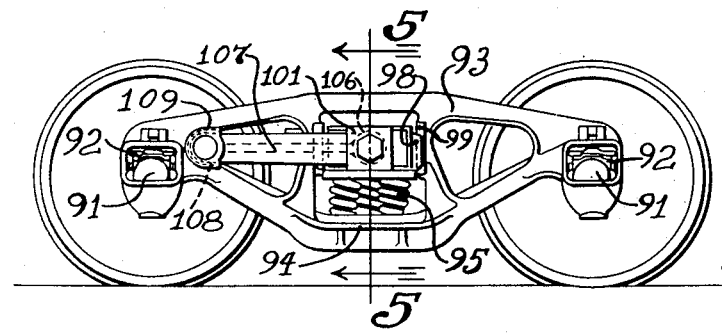
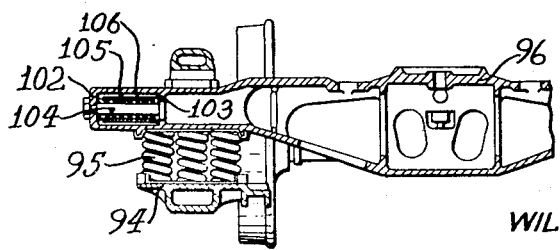

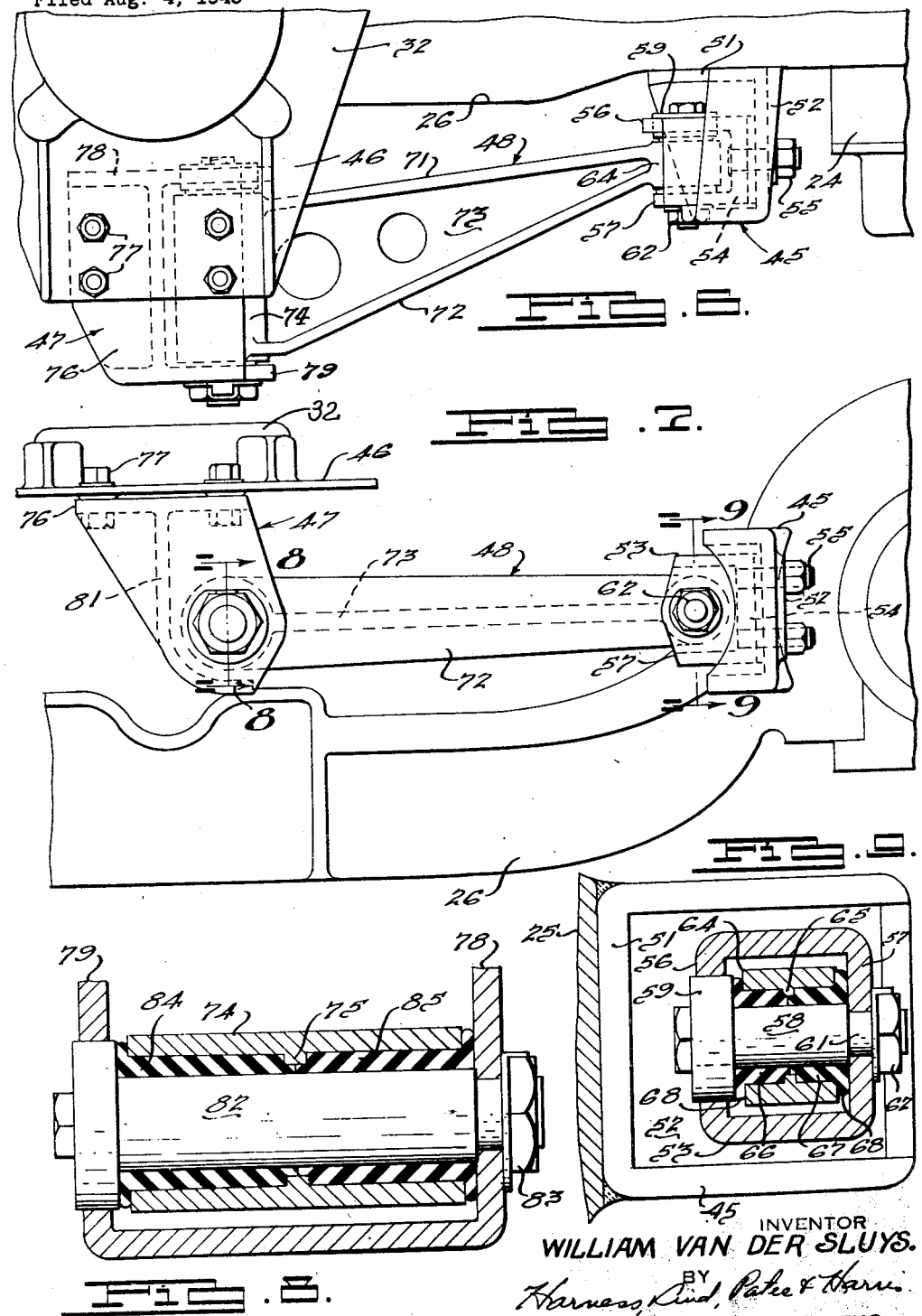

Patented Feb. 28, 1950

2,498,745

UNITED STATES PATENT OFFICE 2,498,745

LINK STABILIZED RAILWAY TRUCK

William Van Der Sluys, Detroit, Mich., assignor, by mesne assignments, to Chrysler Corporation, Highland Park, Mich., a corporation of Delaware Application August 4, 1943, Serial No. 497,281

12 Claims. (Cl. 105—194)

This application is a continuation-in-part of application Serial Number 436,779, filed March 30, 1942, now abandoned.

This invention relates to railway car trucks, and it has particular reference to the provision of a novel and improved thrust link construction for stabilizing the motion between relatively movable portions of such trucks.

In most trucks employed for rail passenger or freight service, the truck frame includes portions connected to the car axles, and a spring-suspended, transversely disposed, transom or bolster member which is free to move in vertical, lateral, and longitudinal directions with respect to the car axles. While some degree of motion is desirable, particularly in a vertical direction, it is essential to restrain relative motion in transverse and longitudinal directions. Solid contact against stops is productive of annoying vibrations and jolts which, under extreme or high speed conditions, may become actually dangerous. Recourse has therefore been made heretofore to thrust links, so connected between the relatively movable side frame and transverse members that one set of links will limit motion in one plane, while another set will similarly limit the permissible displacement in another direction.

The present invention, by way of improvement on the prior art practices, contemplates a truck construction capable of absorbing shocks and vibrations before they are transmitted to the car body, and wherein a single set of stabilizing members, connected between relatively movable portions of the truck frame, are employed to limit the permissible displacements, such stabilizers acting in more than one plane, in contradistinction to known practices. The arrangement is such, for example, that motion in two of the possible reference planes is limited to small values which safeguard the truck members from excessive displacements, without, however, interfering with the desirable riding qualities of the truck. Links according to the present invention may include rubber or like resilient bushings, yieldable to a limited and desirable extent under shearing, compressive, or tensile stresses, and which tend, through the developed strains, to restore the truck parts to a normal condition as such stresses are relieved.

The principles of the invention, and the advantages to be derived from the practice thereof, will become fully apparent from a perusal of the following detailed description of typical embodiments and applications thereof, illustrated in the accompanying drawings, wherein:

Fig. 1 is a plan view of a passenger truck incorporating the invention;

Fig. 2 is a side elevation of the truck shown in Fig. 1;

Fig. 3 is a plan view of a freight car truck to which the invention is applied;

Fig. 4 is a side elevation of the truck shown in Fig. 3;

Fig. 5 is a section taken substantially along the line 5—5 of Fig. 4, and showing how the novel thrust link may be connected to one of the relatively movable truck members;

Fig. 6 is an enlarged plan view of the thrust link applied to the truck of Fig. 1;

Fig. 7 is a side elevation thereof; and

Figs. 8 and 9 are sections taken respectively along the lines 8—8 and 9—9 of Fig. 7.

Referring first to Figs. 1 and 2, there is illustrated a passenger car truck comprising spaced axles 21 carrying wheels 22 which engage the track rails 23. The axles are connected, at their ends, through bearings 24 to side frame members 25 to provide a substantially squared frame unit. Each frame 25 is formed with a drop section 26 on which are positioned spaced coil springs 27, in turn supporting a beam 28 which is restrained from undue vibration by shock absorbers 29, connected between the beam and frame. The beam 28 carries a relatively soft and undampened coil spring 31 which engages an end of a transversely disposed transom frame 32. Since this transom member is independent of the side frames, it will be apparent that it can move in all directions relative thereto, and it will also be appreciated that while vertical motion is desirable, unrestricted longitudinal or transverse displacement is not.

The transom provides a mounting for portions of the brake rigging, not shown, through frame sections 34, and it also supports, through swing hangers 35, a truck bolster 36 whose central portion is formed with a bearing adapted to receive the body bolster of the car body 39. Longitudinally extending thrust links 41, connected by universal joints 42 and resilient pads 43 between the truck bolster and transom frame sections 34, preclude undue relative motion between these two members. These particular links are of a known type, and are effective to tie the truck bolster and floating transom together with respect to longitudinal motion between the two parts. It remains, however, to stabilize the transom and associated parts in respect of longitudinal and transverse displacements between the transom and side frames 25.

For this purpose, the side frames are each provided with brackets 45, located preferably at opposite ends of the truck and on either side thereof, and the relatively movable transom is provided on its end portions 46 with depending brackets 47, which face in opposite directions as viewed in plan, or toward the associated bracket 45. Stabilizers 48, made according to the present invention, are then connected between the respective pairs of brackets. For a detailed description of such stabilizers, reference may now be made also to Figs. 6 to 9 inclusive.

The side frame bracket 45 is formed as a hollow box having an inside vertical wall 51 which is welded or bolted to the side frame, and a back wall 52 against which is positioned a second boxlike member or clevis 53, having a back wall 54 for receiving securing bolts 55, and spaced side walls 56 and 57 for mounting a pin 58. The pin 58 is formed with a large head 59 positioned in a complementary aperture formed in the side wall 56, with a bearing portion intermediate the walls, and a reduced threaded neck portion 61 which projects through an aperture formed in the wall 57 to receive a lock nut 62. The link 48 is formed, at its end adjacent the bracket 45, with an eye portion 64 having an internal, medially located, annular rib 65, so dimensioned as to be spaced from the pin 58 when the parts are concentrically aligned. Bushings 66 and 67, of rubber or other resilient material, are interposed between the eye 64 and the pin 58, abutting the rib 65 at one end, and overlapping the side faces of the eye through shouldered portions 68, which are pinched up from the ends of the bushings, between the side faces and the head 59 and wall 57 respectively, upon assembly.

The link 48 is advantageously formed as a tapered metallic member having an I beam section composed of flanges 71 and 72, and a web 73 which may be perforated to reduce the total weight. These elements, which merge into the eye 64 at one end, extend toward the bracket 47, where they terminate in another and larger eye portion 74, having an internal annular rib 75, and similar to the eye 64 just described. The bracket 47 is formed with a top wall 76, which receives bolts 77 connecting it to the transom part 46, and with vertical side walls 78 and 79 which are reinforced by a back wall 81. The connection between the bracket 47 and eye 74 is similar to that just described, the walls 78 and 79 being formed with apertures receiving a headed and shouldered pin 82, secured by a lock nut 83, and spaced from the eye 74 by means of rubber bushings 84 and 85.

Under operating conditions, the transom 32, and the car and truck parts carried thereby, will tend to move in all directions relative to the wheels 22, in response to the track irregularities and other disturbances encountered. In order to prevent undue relative motions, particularly in transverse and longitudinal directions, the bushings 66, 67, and 84, 85, are given a fairly snug fit between the internal walls of the link eyes 64 and 74 and the pins 58, 82. When the nuts on the pins are drawn up, such degree of compression is obtained as may be desired for the operating conditions to be encountered. It will be seen that a longitudinal displacement is resisted by the rigidity of the link 48, and is yieldably resisted by the bushings themselves, acting in either tension or compression, depending upon the direction of thrust. Hence, while some relative motion is permissible, its actual extent is limited.

When the disturbances induce a transverse displacement between the axles and the relatively movable transom and bolster members, the several bushings are subjected to a shearing stress with compression in the pinched up shoulders, which also yieldably resists the displacement. Under such lateral loads, the link 48 acts as a cantilever beam, relatively fixed at the wide end, since the wide spacing of the bushings at the transom end enables them to resist bending moments about a vertical axis. This puts the bushings in compression at opposite corners. When both longitudinal and transverse forces are applied, the resulting stress is, of course, compounded, but both forces are also resisted through the same links. When the displacement is in a vertical plane, the stress acts in torsion, in which the rubber bushings have a low deflection rate and the movement is free, thereby to enable the spring suspension system to accomplish its intended purpose of cushioning against vertical displacements of the wheels, without having too much freedom of motion in horizontal planes. It may here be noted that the bushings can be readily proportioned and adjusted so that, while they have a relatively high resistance to horizontally imposed forces, they yield quite freely to purely vertical loads, the eyes and entire link 48 pivoting on the pins 58 and 82. Accordingly, it will be seen that the one pair of links 48 becomes effective to accomplish all the purposes of the multiple pairs of links heretofore employed, with attendant economies in initial cost. Not only is this advantage obtained, but it has been found, in actual measured tests, that links made according to the present invention produce superior riding qualities in the truck, considered as an entirety.

Applications of the novel link are not limited to passenger car trucks, but may also be made to freight car trucks, one form of which is shown in Figs. 3, 4, and 5. The truck herein illustrated comprises spaced wheel carrying axles 91 whose ends are journaled in the boxes 92 of side frames 93. Each frame is formed with a central seat 94 on which is mounted a plurality of coiled springs 95 which support the opposite ends of the truck bolster 96. In freight trucks of the type here considered, the bolster is formed with flanges 97, 98, which engage the frame, or wear plates 99 thereon, to limit the horizontal displacements. Such method of limiting relative motion produces unsatisfactory riding qualities, and is wholly ineffective for high speed operating conditions.

In order to overcome these defects, the ends 101 of the bolster 96 are formed with vertical walls 102 and 103, which support a pin 104 that is structurally similar and analogous to the pin 82 heretofore described. In other words, the bracket 47 of the first considered embodiment may be considered to be built in the bolster structure. Rubber bushings 105 are positioned between the pin 104 and the internal wall of an eye 106, formed at one end of a stabilizing link 107, which is substantially the same in structure and purpose as the link 48. The opposite end of the link 107 terminates in an eye 108, which is mounted in a bracket 109, secured to the side frame 93, in a manner heretofore described.

In the particular embodiment here under consideration, it will be noted that a link 107 is positioned on either side of the truck, and they are here illustrated as extending in the same direction with respect to the transverse center line, rather than in opposite directions, as shown in Fig. 1. It may moreover be noted that, if desired, the connection at the bracket 109 may be in the form of a ball joint, without inclusion of resilient bushings, since the pin 104 is relatively long, so that enough surface area and bushing material is available to resist the bending reactions which are encountered. While these variations may be resorted to, the preferred practice, is to employ the resilient connections at both ends of the links, so that the bolster 96 will be satisfactorily stabilized, and the frictional wear heretofore tolerated can be eliminated, since the adjacent parts no longer come into rubbing contact.

The link 48 and the link 107 operate in the manner heretofore described to stabilize the floating transom, in the one case, and the floating bolster directly in the other. Both, of course, are transversely disposed members which are movable relative to the wheels and axles, and each therefore represents the part whose motion is to be limited and controlled. It will be seen that, in both applications, the links resist displacements in a direction which is lengthwise of the link, and also in one direction at right angles thereto. The resistance in the third reference plane, at right angles to both the first-noted directions, is so low as to be negligible for the present purposes. Thus, links made according to the present invention leave a different resistance in planes angularly disposed with respect to each other, which permits stabilization of the truck by a fewer number of links.

I claim:

1. In a railway truck, wheels and axles, equalizing members on opposite sides of the truck supported by said axles, a bolster member spring-supported on said equalizing members and received therein but free of direct engagement therewith, and a horizontally disposed anchor connected to and extending between an equalizing member on one side of the truck and the bolster member, the connections between the anchor and the equalizing member and the bolster member including resilient means to cushion forces transmitted between the equalizing member and the bolster member, the anchor at one end having a wide portion for connection to one of said members and a substantially narrow portion for connection to the other member, whereby the equalizing member to which the anchor is connected is held against substantial movement relative to said bolster member longitudinally and transversely of the truck while accommodating relative vertical movement between them.

2. In a railway truck, wheels and axles, equalizing members on opposite sides of the truck supported by said axles, a bolster member spring-supported on said equalizing members and received therein but free of direct engagement therewith and a pair of horizontally disposed anchors extending along the equalizing members at opposite sides of the truck and connecting the bolster member and the equalizing members, the connections between each anchor and the associated equalizing member and the bolster member including resilient means to cushion forces transmitted between the equalizing member and the bolster member, each anchor at one end having a wide portion for connection to one of said members and a substantially narrow portion for connection to the other member, whereby the equalizing member to which the anchor is connected is held against substantial movement relative to said bolster member longitudinally and transversely of the truck while accommodating relative vertical movement between them.

3. A railway truck specified in claim 2, the anchor extending in the same direction from the bolster member along the equalizing members.

4. In a railway truck, wheels and axles, equalizing members supported on the axles on opposite sides of the truck, a truck frame member spring-supported on said equalizing members and free of direct engagement with said equalizing members, a horizontally disposed anchor extending between an equalizing member on one side of the truck and said frame member and having a narrow end and a wide end, means pivotally connecting the narrow end to one member, the wide end of the anchor being provided with an eye extending transversely of the length of the anchor, a pin secured to one member and positioned in the eye, rubber sleeve means positioned between the eye and the pin and extending the length thereof, means applying pressure to the ends of the rubber sleeve means to place the latter under compression, whereby the equalizing member to which the anchor is connected is held against substantial movement relative to said frame member longitudinally and transversely of the truck while accommodating relative vertical movement between them.

5. In a railway truck as specified in claim 4, the truck frame member extending transversely of the truck, and the pin being secured to the truck frame member and serving to associate the wide end of the anchor with truck frame member.

6. In a railway truck, wheels and axles, equalizing members supported on the axles on opposite sides of the truck, a truck frame member spring-supported on said equalizing members and free of direct engagement with said equalizing members, a pair of horizontally disposed anchors extending along the equalizing members at opposite sides of the truck, each anchor having a narrow end and a wide end provided with a transverse eye, means pivotally connecting the narrow end of each anchor with its associated equalizing member, pins secured to the ends of the truck frame member, one pin being positioned in the eye in one anchor, the other pin being positioned in the eye in the other anchor, rubber sleeve means positioned between each associated pin and eye and extending the length thereof, means applying pressure to the ends of each rubber sleeve means to place the latter under compression, whereby the equalizing members are held against substantial movement relative to said frame member longitudinally and transversely of the truck while accommodating relative vertical movement between them.

7. In the railway truck specified in claim 6, the truck frame member being a transom frame, and the anchors extending from the transom frame in opposite directions along the equalizing members.

8. In the railway truck specified in claim 6, the truck frame member being a bolster, the equalizing members having openings receiving the bolster but being free of direct engagement with the equalizing members, and the anchors extending from the transom frame in the same direction along the equalizing members.

9. In a railway truck, a pair of spaced apart, relatively aligned equalizing members, a truck frame member extending transversely between and spring-supported on the equalizing members for relative movement with respect thereto, and a single pair of substantially horizontally disposed stabilizing links, one only of said links being connected between the frame member and the equalizing member at each side of the truck, each link having a wide end connected to one member and a narrow end connected to the other member for holding the connected members against substantial movement with respect to one another longitudinally and transversely of the truck while accommodating relative vertical movement between the members, the connections between each link and the associated equalizing member and frame member including resilient means to cushion the forces transmitted between the equalizing member and the truck frame member.

10. In a railway truck, spaced axles, an equalizing member extending between and supported on the axles at each side of the truck, a truck frame member extending between and spring-supported on said equalizing members and free of direct engagement with the equalizing members, and only a single, substantially horizontally disposed anchor pivotally connected to and extending between each equalizing member on each side of the truck and said frame member, the connections between each anchor and each equalizing member and the frame member including resilient means to cushion forces transmitted between the equalizing members and the truck frame member, each anchor at one end having a wide portion for connection to one of said members and a substantially narrow portion for connection to the other member whereby the equalizing member to which the anchor is connected is held against substantial movement relative to said frame member longitudinally and transversely of the truck while accommodating relative vertical movement between them.

11. In a railway truck, wheels and axles, equalizing members on opposite sides of the truck supported by said axles, a truck frame member spring-supported on said equalizing members and free of direct engagement with said equalizing members, and a single pair of substantially horizontally disposed anchors, said anchors being arranged with a single anchor extending along each equalizing member at opposite sides of the truck, each anchor being pivotally connected to an equalizing member and the frame member, the pivoted connections between the said each anchor and its associated equalizing member and the frame member including resilient means to cushion forces transmitted between the said each equalizing member and the truck frame member, said each anchor at one end having a wide portion for connection to one of said members and at the other end a substantially narrow portion for connection to the other member whereby the equalizing member to which the anchor is connected is held against substantial movement relative to said frame member longitudinally and transversely of the truck while said pivotally mounted end connections permit relative vertical movement between the anchor connected members.

12. In a railway truck, wheels and axles, equalizing members on opposite sides of the truck supported by said axles, a truck frame member spring-supported on said equalizing members and free of direct engagement with said equalizing members, and a single pair of substantially horizontally disposed anchors, said anchors being arranged with a single anchor extending along each equalizing member at opposite sides of the truck, each anchor being pivotally connected to an equalizing member and the frame member, the pivoted connections between the said each anchor and its associated equalizing member and the frame member including resilient means to cushion forces transmitted between the said each equalizing member and the truck frame member, said each anchor at one end having a wide portion for connection to one of said members and at the other end a substantially narrow portion for connection to the other member whereby the aqualizing member to which the anchor is connected is held against substantial movement relative to said frame member longitudinally and transversely of the truck while said pivotally mounted and connections permit relative vertical movement between the anchor connected members, the anchors extending along the equalizing members in opposite directions from their connections with the truck frame member.

WILLIAM VAN DER SLUYS.

REFERENCES CITED

The following references are of record in the file of this patent:

UNITED STATES PATENTS

| Number | Name | Date |
|---|---|---|
| 2,023,756 | Brownyer | Dec. 10, 1935 |
| 2,056,220 | Stout et al. | Oct. 6, 1936 |
| 2,236,410 | Leighton | Mar. 25, 1941 |
| 2,251,453 | Jackson | Aug. 5, 1941 |
| 2,323,348 | Nystrom et al. | July 6, 1943 |
| 2,350,567 | Nystrom et al. | June 6, 1944 |

Certificate of Correction

Patent No. 2,498,745 February 28, 1950

WILLIAM VAN DER SLUYS

It is hereby certified that errors appear in the printed specification of the above numbered patent requiring correction as follows:

Column 5, line 9, strike out "bot bends" and insert instead *both ends*; column 8, line 31, strike out "aqualizing" and insert instead *equalizing*; line 35, for "and connections" read *end connections*;

and that the said Letters Patent should be read with these corrections therein that the same may conform to the record of the case in the Patent Office.

Signed and sealed this 20th day of June, A. D. 1950.

[SEAL]

THOMAS F. MURPHY,
*Assistant Commissioner of Patents.*